United States Patent Office 3,047,544
Patented July 31, 1962

3,047,544
DIFUNCTIONAL POLYMERS AND METHODS
FOR THEIR PREPARATION
Norman R. Byrd, Akron, Ohio, assignor to The Goodyear Tire & Rubber Company, Akron, Ohio, a corporation of Ohio
No Drawing. Filed Oct. 20, 1958, Ser. No. 768,014
6 Claims. (Cl. 260—79)

This invention relates to new compositions of matter. More particularly it relates to polymeric dimercaptans and polymeric glycols and to methods for their preparation.

An object of this invention is to provide new polymeric dimercaptans and methods for their preparation. Another object is to prepare new polymeric glycols from the polymeric dimercaptans. An additional object is to prepare polymeric dimercaptans and polymeric glycols which as the result of their chemical bifunctionality are useful in preparing still higher molecular weight polymeric materials. Other objects will appear as the description proceeds.

Some of the objects of this invention are accomplished by polymerizing, to a number average degree of polymerization of at least 10, at least one monomer containing at least one $H_2C{=}C{<}$ group in the presence of a xanthogen disulfide defined by the formula

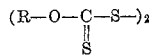

wherein R is an organic radical selected from the group consisting of aliphatic, aryl, aralkyl and alicyclic radicals to form polymeric bis xanthate esters and hydrolyzing the xanthate ester groups to produce polymeric dimercaptans. Other objects are achieved by converting the polymeric dimercaptans to polymeric glycols through reaction with a reactive cyclic oxide such as ethylene oxide, propylene oxide, butylene oxide and butadiene monoxide or with ethylene chlorohydrin.

Representative of the monomers containing $H_2C{=}C{<}$ groups which may be employed to prepare the polymers of this invention are styrene; acrylonitrile; acrylic acid; methacrylic acid; the conjugated diene hydrocarbons such as butadiene-1,3; isoprene; 2-chloro butadiene-1,3; 2,3-dimethyl butadiene-1,3 and 2-ethyl butadiene-1,3; 2-phenyl butadiene-1,3; the ring halogenated styrenes such as the 2, 3 and 4-chloro styrenes; the 2, 3 and 4-bromo styrenes; the 2, 3 and 4-fluoro styrenes; 3-chloro 2-methyl styrene; 3-bromo 2-methyl styrene; 2,5-dichloro styrene; 2,3-dichloro styrene; 2,6-dichloro styrene; the ring alkylated styrenes such as the 2, 3 and 4-methyl and -ethyl substituted styrenes; 2,4-dimethyl styrene; 2,5-dimethyl styrene; 3,4-dimethyl styrene; 3,5-dimethyl styrene; the various diethyl styrenes; the ring alkoxylated styrenes such as 2, 3 and 4-methoxy and -ethoxy styrenes; the dialkyl amino substituted styrenes; the vinyl pyridines such as 2, 3 and 4-vinyl pyridine; 5-ethyl 2-vinyl pyridine; 2-methyl 5-vinyl pyridine and the like; the alkyl acrylic esters such as methyl and ethyl acrylates; methyl and ethyl methacrylates and other substituted butyl acrylates and methacrylates. These monomers may be employed singly to form homopolymeric dimercaptans or two or more monomers which are copolymerizable one with another may be employed to form copolymeric dimercaptans. The monomers containing only one $H_2C{=}C{<}$ group, of course, polymerize through this unsaturated group to form straight chain polymers made up of successive monomer units. Monomers containing more than one $H_2C{=}C{<}$ group and particularly the conjugated dienes will polymerize to form polymers containing unsaturation in the chain of monomer units as well as pendant unsaturated groups.

The xanthogen disulfides employed in the practice of this invention to form the bis xanthate ester of the polymers and copolymers function as chain transfer agents or modifiers, as they are more commonly referred to in the polymerization art. These xanthogen disulfides may be represented by the formula

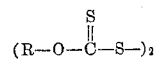

wherein R may be an aliphatic radical such as methyl, ethyl, propyl, isopropyl, butyl, isobutyl, amyl or lauryl; an aryl radical such as phenyl, ortho-methyl phenyl, para-methyl phenyl, ortho-chloro phenyl, 2,4-dichloro phenyl, alpha-naphthyl, beta-naphthyl, or anthracyl; an aralkyl radical such as benzyl or 1 or 2-phenethyl; an alicyclic radical such as cyclohexyl, cyclopentyl or cyclobutyl. Representative examples of the xanthogen disulfide useful in the practice of this invention are diisopropyl xanthogen disulfide, diethyl xanthogen disulfide, dibutyl xanthogen disulfide, diamyl xanthogen disulfide, dilauryl xanthogen disulfide, diphenyl xanthogen disulfide, di (ortho-methyl phenyl) xanthogen disulfide, di (p-methyl phenyl) xanthogen disulfide, di (ortho-chloro phenyl) xanthogen disulfide, di (2,4-dichloro phenyl) xanthogen disulfide, di (alpha-naphthyl) xanthogen disulfide, di (beta-naphthyl) xanthogen disulfide, di (1-anthracyl) xanthrogen disulfide, di (1-phenethyl) xanthogen disulfide, dibenzyl xanthogen disulfide, di (2-phenylethyl) xanthogen disulfide, dicyclohexyl xanthogen disulfide, dicyclopentyl xanthogen disulfide and dicyclobutyl xanthogen disulfide.

The amount of xanthogen disulfide employed in the practice of this invention may be varied over comparatively wide limits, it having been found that from 2 to 45 parts by weight of disulfide per 100 parts by weight of monomer will accomplish the desired results. If more than the indicated upper limit of disulfide is employed it has been observed that the molecular weight of the polymeric dimercaptan formed is lower than desired.

If less than the indicated minimum of disulfide is employed the molecular weight of the resulting polymeric dimercaptan is so high that the products are not useful for the intended purpose. Preferred amounts of disulfide are from 4 to 26 parts by weight per 100 parts by weight of monomer. In general it may be said that the more disulfide used the lower will be the molecular weight of the resulting polymeric dimercaptan. A number average degree of polymerization of approximately 20 has been achieved using 26 parts by weight of disulfide.

The term "number average degree of polymerization" as used herein may be defined as the number of monomer units in one polymeric molecular chain. For example, in homopolymerization "one monomer unit" is equal to the molecular weight of the monomer employed. In copolymerizing mixtures of monomers "one monomer unit" represents the quantity of polymer molecule that contains mol fractions of each combining monomer such that the sum of all the mol fractions is equal to one. The mol fraction of each of the monomers in a structural unit is determined by the combining ratio of each of the monomers in the make up of the whole polymer molecule.

As indicated above, the preparation of the polymeric dimercaptans is accomplished in two steps. First the monomer or monomers containing at least one $H_2C{=}C{<}$ are polymerized in the presence of a xanthogen disulfide to form a polymeric bis xanthate ester which may be defined by the formula

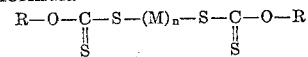

where R is selected from the group consisting of aliphatic, aryl, aralkyl and alicyclic radicals, M is a monomer unit and n, the number average degree of polymerization, is at least 10. In preparing the polymeric dimercaptans any conventional free-radical polymerization system may be employed. Emulsion polymerization employing a surface active agent such as soap in an aqueous medium to form an emulsion of the monomer is preferred. Bulk polymerization in which the monomer is polymerized in the presence of the xanthogen disulfide and a free radical initiator has also been found to be effective. The general techniques of free-radical polymerization systems as to time, temperature, concentration and other reaction conditions are so well known as not to require further detailed explanation.

The polymerization reaction is initiated through the use of free radical mechanisms. The selection of the free radical initiator will, of course, depend upon the specific monomers involved and the time and temperature of polymerization, such selection being well within the knowledge of those skilled in the art. Representative examples of the free radical initiators which may be employed are bis azoisobutyronitrile, mixtures of diazoamino benzene and hydroquinone, inorganic persulfates such as potassium persulfate, peroxides such as hydrogen peroxide, ditertiary butyl peroxide, dicumyl peroxide and benzoyl peroxide and hydroperoxides such as tertiary butyl hydroperoxide and 2,5-dimethyl dihydroperoxide.

The polymeric bis xanthate esters are hydrolyzed in the second step of the overall reaction to produce polymeric dimercaptans corresponding to the formula HS—(M)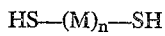—SH wherein M and n represent the same constituents as defined above. This hydrolysis may be accomplished in any one of a variety of ways including the use of alcoholic potassium hydroxide, a secondary amine or other acidic and basic hydrolysis techniques well known in the art.

The conversion of the polymeric dimercaptans to polymeric glycols results from the addition reaction between the dimercaptan and a halohydrin such as ethylene chlorohydrin or a reactive cyclic oxide such as ethylene oxide, propylene oxide, butylene oxide, butadiene monoxide, styrene oxide, cyclohexene oxide or the oxide of vinyl cyclohexane. This hydroxyl-terminated addition product may be represented by the general formula H—R<sub>x</sub>—S—(M)<sub>n</sub>—S—R<sub>x</sub>—H 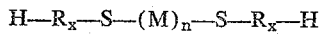

wherein M and n are as defined above, R is the ethoxy unit

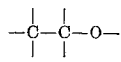

and x is a whole number. If, for instance, one mol of polymeric dimercaptan were reacted with two mols of ethylene oxide, the addition product would be represented by HO—CH₂—CH₂—S—(M)<sub>n</sub>—S—CH₂—CH₂—OH. 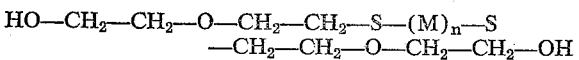
Whereas the product of four mols of ethylene oxide and 1 mol of dimercaptan would be HO—CH₂—CH₂—O—CH₂—CH₂—S—(M)<sub>n</sub>—S
　　　—CH₂—CH₂—O—CH₂—CH₂—OH The use of the other reactive cyclic oxides or ethylene chlorohydrin would yield similar configurations with the ethylene chain carbons being substituted by methyl, ethyl, phenyl, cyclohexyl, vinyl or chlorine radicals as the case might be.

The polymeric dimercaptans as well as the polymeric glycols prepared in accordance with the teachings of this invention may be used to prepare still other difunctional polymeric materials such as halogenated polymers, carboxylated polymers, aminated polymers, urethane polymers and thiourethane polymers by reaction with ethylene oxide, halogenated alkyls, diisocyanates, or acrylonitrile followed by reduction to the diamine or hydrolysis to the dicarboxylate. The dimercaptans and the glycols as well as the conversion products made therefrom may be used in any one of various ways such as in condensation reactions or extension reactions with other difunctional materials, to form block or graft polymers of still higher molecular weight. In addition, oxidation of the polymeric dimercaptans will yield polymeric disulfides. Treatment with a ketone or aldehyde will form polymeric thioketals or thioacetals. Reaction with phosgene will yield polymeric dithiocarbonates. It should be appreciated that, as contrasted to the hydroxyl terminated polyesters, polyethers, polythioesters and polythioethers which have found widespread application in the development of polyurethanes and polythiourethanes, the polymeric dimercaptans and polymeric glycols of this invention provide a backbone for reaction with diisocyanate which is entirely made up of carbon to carbon linkages. This chemical structure removes some of the inherent weaknesses of the ester and ether linkages present in the known forms of polyurethanes and polythiourethanes.

The practice of this invention is further illustrated with respect to the following examples which are illustrative rather than limitative of the scope of this invention. These examples illustrate the polymerization of the monomer or monomers to form the bis xanthate esters, the hydrolysis of such esters to the dimercaptans, the formation of polymeric glycols from the dimercaptans and other experiments in which the difunctionality and utility of the new polymeric materials are shown.

In these examples the determination of the dilute solution viscosity (D.S.V.) and titration techniques were employed as indications of the molecular weight of the polymers produced and their bifunctional nature. The relationship of number average molecular weight to viscosity in the polystyrene examples has been discussed and explained in an article by Gregg and Mayo in the "Journal of American Chemical Society," vol. 70, p. 2375 (1948).

*Example 1*

Into a suitable reaction vessel equipped with a thermometer, a stirrer, a water-cooled condenser and an inlet to maintain a sweeping nitrogen atmosphere, were placed the following materials:

100 grams of styrene
180 grams of water
4 grams of sodium lauryl sulfate sold by E. I. du Pont de Nemours & Co. under the name Duponol ME
0.3 gram potassium persulfate
2.5 grams diisopropyl xanthogen disulfide
5 milliliters of activator solution The activator solution was made up as follows: 10 grams of sodium pyrophosphate decahydrate was dissolved in 50 grams of water. To this were added 0.70 gram of a 78% aqueous solution by weight of ferric sulfate and 0.025 gram of cobaltous chloride hexahydrate. The complete mixture was then diluted with water to 100 milliliters by volume. The solution was a clear, light green color. To prevent its deterioration as an activator it was protected from light on storage. This activator solution was used in all following examples where the use of an activator is indicated.

The materials were stirred continuously for 2 hours at 70° to 75° C. at the end of which time an additional 1.5 grams of diisopropyl xanthogen disulfide and 2.5 milliliters of activator solution were added. After a total of 7 hours reaction time the emulsion was coagulated to recover 53 grams of polymeric material believed to be bis xanthate ester of polystyrene. The dilute solution viscosity (D.S.V.) of this polymeric material was 0.15.

*Example 2*

The general procedure of Example 1 was followed except that 104 grams of styrene, 0.52 gram of potassium persulfate, 19 milliliters of activator solution and 10.4 grams of diisopropyl xanthogen disulfide were used. All of the ingredients were added initially, and the temperature was maintained at about 85° C. After three hours polymerization time 108 grams of polymer having a D.S.V. of 0.09 was obtained.

Example 3

The procedure described in Example 2 was followed except that 0.6 gram of potassium persulfate, 27 grams of diisopropyl xanthogen disulfide and 50 milliliters of activator solution were used. After 9 hours at 85° C. there was obtained 106 grams of polymer having a D.S.V. of 0.05.

Example 4

The procedure described in Example 2 was followed except that 15.6 grams of diisopropyl xanthogen disulfide and 28.5 milliliters of activator solution were used. After 3 hours at 85° C. there was recovered 113 grams of polymer having a D.S.V. of 0.06.

The hydrolysis of the xanthate ester of polystyrene by means of alcoholic KOH to form the desired dimercaptan polymer was accomplished as follows: Into a suitable reaction vessel equipped with a stirrer, a thermometer, a water cooled condenser and a gas inlet tube to maintain a nitrogen atmosphere, were placed 56 grams of the bis xanthate ester of polystyrene prepared as described above, 90 milliliters of benzene, 50 milliliters of ethanol and 8 grams of potassium hydroxide. This mixture was heated for 7 hours at 65° C. and then neutralized with concentrated hydrochloric acid. The benzene phase was separated from the aqueous phase which was discarded. The benzene phase was then washed with water until neutral and concentrated on a steam bath. The concentrated benzene solution was precipitated into isopropanol. A yield of 45.9 grams of polymer having a D.S.V. of 0.06 was obtained. To determine the presence of —SH groups, 0.3 gram of the polymer was dissolved in a mixture of 100 milliliters of methyl ethyl ketone and 20 milliliters of benzene. To this were added 30 drops of water and 40 drops of concentrated ammonium hydroxide. The resultant mixture was titrated with 0.01 molar solution of silver nitrate in isopropanol. A Beckman model H2 pH meter with a glass electrode and a silver/silver sulfide electrode was used to determine the end-point. Assuming the polymer to be a dimercaptan, from the number of —SH groups found in this 0.3 gram sample it was calculated that the dimercaptan polystyrene had a number average molecular weight of 2424.

The hydrolysis by means of a secondary amine of the xanthate ester of polystyrene to form the desired dimercaptan polymer was accomplished as follows: Into a suitable reaction vessel which had been thoroughly flushed with nitrogen were placed 48 grams of the bis xanthate ester of polystyrene prepared as described above, 200 milliliters of benzene and 10 grams of piperidine. This mixture was maintained at 50° C. while being agitated for 18 hours. At the end of this time the mixture was treated with concentrated hydrochloric acid until it was acid and washed with water until the mixture was neutral. The benzene phase separated and essentially all the benzene was evaporated. This resulted in a viscous solution which was precipitated into methanol, filtered, washed and dried in a vacuum oven at room temperature. A yield of 42.5 grams of polymeric material having a D.S.V. of 0.054 was obtained. This polymeric material was analyzed for —SH groups in the same manner as described above and —SH groups were found to be present. Assuming the polymer to be difunctional, from the number of —SH groups found by titrating the weighed sample, the number average molecular weight of the polymer was calculated to be 2290.

As evidence of the difunctionality of the hydrolyzed xanthate esters described above the following experiments were conducted: To a suitable vessel was added 2.8 grams of the alcoholic potassium hydroxide hydrolyzed xanthate ester of polystyrene prepared as described above dissolved in 15 milliliters of benzene. To this were added 0.2 gram of sodium methylate and 30 milliliters of 0.8 normal aqueous iodine solution. The mixture was placed in the dark for 41 hours at the end of which time the excess iodine was removed by treatment with sodium thiosulfate. The benzene phase was then separated from the aqueous phase and washed with water. The mixture was added to isopropanol and a polymeric material precipitated. A yield of 2.7 grams of polymeric material having a D.S.V. of 0.31 was obtained. It is known that —SH groups will readily form disulfides through iodine oxidation. Monomercapto polymer units would, of course, form dimer units through the coupling of two mono —SH groups. Similarly dimercapto polymer units would through the formation of successive disulfides form new polymer units containing more than two units of the original polymer. It is evident from the substantial increaes in D.S.V. from the starting material (0.06) to the reaction product (0.31) that the starting material was difunctional.

As further evidence of the difunctionality of the dimercaptans of this invention the following experiment was conducted: In a suitable reaction vessel 2.2 grams of the polymeric disulfide prepared as described above and having a D.S.V. of 0.31 was dissolved in 30 milliliters of benzene. To this were added 10 milliliters of ethanol and 11.8 grams of an 83% sulfuric acid solution. Zinc dust was gradually added to the reaction mixture to prevent overheating until a total of 6.5 grams of zinc dust had been added. The reaction mixture was maintained at a temperature of 45° C. for 42 hours and then filtered to remove excess zinc dust. The filtrate was washed with water and precipitated into isopropanol. A yield of 1.63 grams of a polymeric material having a D.S.V. of 0.054 was obtained. Titration in the manner disclosed about revealed the presence of —SH groups in the polymer. Thus the previously formed polymeric disulfide had been reduced to a polymeric dimercaptan having a molecular weight equivalent to that of the polymeric dimercaptan employed to make the polymeric disulfide.

The reduced polymeric dimercaptan having a D.S.V. of 0.054 in the amout of 1.05 grams was dissolved in 10 milliliters of benzene. To this was added 2 milliliters of an 0.5 normal potassium hydroxide solution in ethyl alcohol. The mixture was stirred for 20 hours at a temperature of 35° C. while being exposed to the atmosphere. At the end of this time the mixture was precipitated into isopropanol, filtered, washed with water and ethyl alcohol and dried in a vacuum oven. A yield of 1 gram of polymeric material having a D.S.V. of 0.48 was obtained. An analysis for —SH groups indicated that no —SH groups were present. Thus, the polymeric dimercaptan had been reoxidized to a polymeric disulfide as indicated by the absence of —SH groups and by the substantial increase in dilute solution viscosity.

Following the successive reactions described above it becomes evident that a complete cycle proving the difunctionality of the polymers of this invention has been accomplished. A low molecular weight polymeric dimercaptan was first oxidized to a high molecular weight polymeric disulfide then reduced to a low molecular weight polymeric mercaptan and finally reoxidized to form a high molecular weight polymeric disulfide.

As still further evidence of the difunctionality of the polymeric dimercaptans prepared according to the practice of this invention the following experiment was conduced to convert the dimercaptan to a polymeric glycol and extend the glycol so formed through reaction with diisocyanate. A portion (3 grams) of the polystyrene dimercaptan prepared from the reaction between the xanthate ester and the alcoholic KOH prepared in Example 4 was dissolved in 10 milliliters of benzene. To this were added 1 milliliter of a 0.5 normal potassium hydroxide solution in ethanol and 0.22 gram of ethylene oxide. Upon the addition of the ethylene oxide the clear liquid became cloudy and an exothermic reaction took place. The reaction vessel was maintained at 50° C. for 20 hours after which the mixture was precipitated into isopropanol. A yield of 1.9 grams of polymeric material having a D.S.V. of 0.06 was obtained. Titration procedures described above revealed that no —SH groups were present in the polymer, indicating that the —SH groups had been converted to —OH groups. This dihydroxy polystyrene (0.7 gram) was dissolved in 2 milliliters of benzene to which was added 0.375 gram of diphenylmethane 4,4'-diisocyanate. The mixture was heated in a closed vessel for 17 hours at 64° C. following which it was precipitated into isopropanol, filtered, washed and dried. A yield of 0.76 gram of polymeric material having a D.S.V. of 0.18 was obtained. Again the substantial increase in D.S.V. from the starting material to the reaction product is evidence of the difunctionality of the starting material.

Instead of converting the polymeric dimercaptans to polymeric glycols to be extended still further with diisocyanate it is possible to employ the polymeric dimercaptans themselves in reaction with diisocyanates to form still higher polyhtiourethanes as indicated by the following experiment: To a suitable reaction vessel were added 30 milliliters of toluene, 0.064 gram of 92% pure meta phenylene diisocyanate and 1 gram of the polystyrene dimercaptan prepared in Example 4 by reaction between the xanthate ester and piperidine. The solution was heated gently on a hot plate for 3 minutes and then stirred for 90 hours at room temperature after which time the mixture was precipitated into ethanol. A yield of 0.85 gram of a polymeric material having a D.S.V. of 0.14 was obtained. Here again the substantial increase in dilute solution viscosity from the starting material to the reaction product is evidence of the difunctionality of the dimercaptan.

As still further evidence of the difunctionality of the polymeric dimercaptans and of the utility of these materials to form higher molecular weight block polymers the following experiment was conducted: To a suitable reaction vessel were charged 30 milliliters of benzene, 3.12 milliliters of an 0.5 normal potassium hydroxide solution in ethanol, 0.263 gram of 1,5 diidopentane and 1.8 grams of the polymeric dimercaptan prepared as disclosed in Example 4 and resulting from the reaction between the xanthate esters and piperidine. The mixture was warmed slightly on a hot plate and allowed to stand at room temperature for 96 hours after which it was precipitated into isopropanol. A light yellow powdered polymeric material (1.5 grams) having a D.S.V. of 0.10 was obtained. Once again the observed increase in dilute solution viscosity from the starting material to the reaction product is evidence of the difunctional character of the starting material.

*Example 5*

Into a suitable reaction vessel described in Example 1 were placed the following materials:

26 grams styrene
3.4 grams diethyl xanthogen disulfide
40 milliliters of water
1 gram sodium lauryl sulfate
5 milliliters of activator solution
0.18 gram of potassium persulfate After a polymerization time of 9 hours at 85° C. the emulsion was precipitated into methanol. A yield of 28 grams of the bis xanthate ester of polystyrene was obtained.

The hydrolysis of this polymer to the dimercaptan polystyrene was accomplished as follows: In a suitable vessel the 28 grams of the polymeric material was dissolved in 50 milliliters of benzene. To this was added 15 grams of piperidine. The reaction vessel was sealed and stored for 4 days at room temperature. At the end of this time it was acidified with hydrochloric acid and washed with water until neutral. The benzene was removed by evaporation. This resulted in a yield of 28 grams of polymeric material having a D.S.V. of 0.07. The titration procedure described in Example 4 indicated the presence of —SH groups. Assuming difunctionality, from the number of —SH groups found in the weighed sample, the molecular weight was calculated to be 2690.

*Example 6*

Styrene (52 grams), diisopropyl xanthogen disulfide (7.8 grams) and azoisobutyronitrile (0.30 gram) were placed in a 4-ounce, screw capped bottle. Oxygen-free nitrogen was bubbled through the mixture. The vessel was sealed and placed in an oven at 80° C. for a period of 48 hours. The contents were precipitated into methanol. A yield of 48.5 grams of bis xanthate ester of polystyrene was obtained. This ester hydrolyzed in the same manner described in Example 4 yields the polystyrene dimercaptan.

*Example 7*

The general procedure of Example 1 was followed except that the following reactants were used:

26 grams styrene
40 grams water
5 milliliters activator solution
1 gram sodium lauryl sulfate
6.7 grams diisopropyl xanthogen disulfide
0.10 gram 2,2' azoisobutyronitrile (catalyst)

After 20 hours at 85° C. the emulsion was coagulated by means of methanol resulting in a yield of 16 grams of the bis xanthate ester of polystyrene. To convert this ester to the polystyrene dimercaptan, 10 grams of the ester was dissolved in 50 milliliters of benzene and 7 grams of piperidine was added. Under nitrogen this mixture was allowed to stand for one hour at 50° C. and 16 hours at room temperature. At the end of this time the mixture was made acid with hydrochloric acid, washed until neutral and dried. This resulted in a yield of 10.5 grams of polystyrene dimercaptan having a D.S.V. of 0.078. Titration procedures described in Example 4 proved that —SH groups were present in the polymer.

*Example 8*

Into a clean, 4-ounce, screw-capped bottle were placed the following ingredients:

20 grams butadiene
1 gram diisopropyl xanthogen disulfide
36 milliliters of soap solution [1]
0.1 gram potassium persulfate
0.1 gram sodium carbonate peroxide ($2Na_2CO_3.3H_2O_2$)
1 gram sucrose
3 milliliters of activator
0.0058 gram n-lauryl mercaptan This mixture was reacted at 50° C. for 18½ hours. At the end of this time the mixture was coagulated using a mixture of salt and isopropanol. The resulting polymer was treated with 0.1 gram of N,N' diphenyl p-phenylene diamine and 0.1 gram of bis 4,4' dimethyl-6,6' ditertiary butyl-2,2' methylene phenol as antioxidants and dried in a vacuum oven at room temperature. A yield of 16 grams of a viscous oil was obtained. This 16-gram portion of viscous oil was dissolved in 50 milliliters of benzene and treated with 4 grams of morpholine. It remained under a nitrogen atmosphere for 3 days at room temperature. At the end of this time the mixture was treated with concentrated hydrochloric acid and washed with water until neutral. The benzene was removed on a steam bath. A polybutadiene dimercaptan having a D.S.V. of 0.31 was obtained. Analysis for mercaptan groups as described in Example 4 indicated the presence of —SH groups. Assuming the polymer to be difunctional, using the weight of sample analyzed and the —SH groups found, it was calculated the molecular weight of this polybutadiene dimercaptan was about 6620.

Into a suitable reaction vessel were added 5 milliliters of a benzene solution of diphenyl methane 4,4'-diisocyanate containing 0.5 gram of diisocyanate per milliliter

---

[1] Soap solution—17.2 grams of sodium tallow soap in 360 milliliters of water.

of solution and 8.5 grams of the dimercapto polybutadiene prepared as described above. This mixture was placed in a 100° C. oven for 45 minutes under an atmosphere of nitrogen. It was then removed and placed in a dessicator for 18 hours at room temperature. At the end of this time the reaction product was a soft, sticky rubber. Additional heating for one hour at 100° C. resulted in a tacky rubbery polymer containing no gel and a D.S.V. of 0.82. The change in form of the initial polymer from that of a viscous oil to that of a rubbery polymer and the observed substantial increase in the dilute solution viscosity of the rubbery product indicate the difunctional character of the polybutadiene dimercaptan.

To prepare a polymeric glycol from the dimercapto polybutadiene prepared as indicated above, 150 milliliters of benzene was mixed with 57 grams of the dimercapto polybutadiene having a D.S.V. of 0.31, 28 milliliters of an 0.5 normal potassium hydroxide solution in ethanol and 22 grams of ethylene oxide. The mixture was maintained at 50° C. for 21 hours under an atmosphere of nitrogen after which it was acidified with concentrated hydrochloric acid, washed until neutral and precipitated in isopropanol. Titration procedures described above indicated no —SH groups present. This dihydroxy polybutadiene (26.7 grams) having a D.S.V. of 0.4 was mixed with 1.848 grams of 3,3" tolylene 4,4' diisocyanate and heated to 100° C. After 15 minutes the reaction mixture became viscous and cloudy. It was poured into a mold and placed under nitrogen in a 105° C. oven for 4 hours. A soft rubbery material was produced having a gel content of zero and a dilute solution viscosity of 1.0.

*Example 9*

A copolymeric dimercaptan was prepared as follows: The following reactants were placed in a 4-ounce bottle:

15 grams butadiene
5 grams styrene
37 milliliters of soap solution (prepared as in Example 8)
1 gram sucrose
1 gram diisopropyl xanthogen disulfide
0.1 gram potassium persulfate
0.1 gram sodium carbonate peroxide
3 milliliters of activator solution
0.008 gram n-lauryl mercaptan These reactants were allowed to polymerize at 50° C. for 16 hours. The polymer was treated with the same antioxidants as in Example 8. A yield of 15.5 grams of a viscous oil was obtained. The hydrolysis of the bis xanthate ester of butadiene/styrene copolymer was accomplished by dissolving 7.5 grams of this polymeric material in 20 milliliters of benzene and adding 8 grams of piperidine. This mixture was stored for 20 hours under a nitrogen atmosphere at room temperature. At the end of this time it was coagulated into isopropanol resulting in a yield of 7 grams of a dimercaptan of polybutadiene/styrene copolymer having a D.S.V. of 0.16. Assuming difunctionality, from the number of —SH groups found, it was calculated that the molecular weight of the dimercaptan was 3268.

To illustrate the difunctionality and further utility of such a butadiene/styrene copolymer dimercaptan an extension by means of diisocyanate was performed as follows: To 11 milliliters of a benzene solution containing 0.5 gram of diphenylmethane 4,4'-diisocyanate per milliliter of solution was added 7 grams of the butadiene/styrene copolymer dimercaptan prepared as described above. This mixture was placed under a nitrogen atmosphere and maintained at 85° C. for 8 hours. It was then placed in a desiccator for approximately 16 hours. A soft rubbery material resulted which had a D.S.V. of 0.57 and no gel.

As further proof of the structure of the bis xanthate esters formed in the practice of this invention, infra-red studies of a diisopropyl xanthogen disulfide modified polystyrene, when compared to a model compound (ethyl-S-ethyl xanthate), showed absorption at 9.65μ (attributed to the C—O—C group) and at 8.2μ and 9.2μ (attributed to the

group). Subsequent hydrolysis of the polymer and an infra-red analysis of the hydrolyzed product showed no absorption at the above mentioned peaks attributed to the xanthate ester structure. The hydrolysis of the ester to the mercaptan was evident from the titration of the hydrolyzed product with silver nitrate which conclusively demonstrated the presence of the —SH group.

In addition to the specific reactants, initiators, reaction conditions and hydrolysis techniques shown in the above examples, other monomers, other disulfides, other initiator systems and other hydrolysis techniques may be employed as more fully explained above to produce the polymeric dimercaptans and the polymeric glycols of this invention.

While the specific examples shown above illustrate the isolation of the bis xanthate ester prior to the hydrolysis step it is within the scope of this invention to carry out the hydrolysis of the ester without isolating the ester in dry form.

While certain representative embodiments and details have been shown for the purpose of illustrating the invention, it will be apparent to those skilled in this art that various changes and modifications may be made therein without departing from the spirit or scope of the invention.

I claim:

1. A method for preparing polymeric dimercaptans which comprises mixing at least one monomer containing at least one $H_2C=C<$ group with a xanthogen disulfide defined by the formula

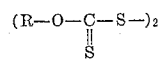

wherein R is an organic radical selected from the group consisting of aliphatic, aryl, aralkyl and alicyclic radicals and polymerizing, to a number average degree of polymerization of at least 10, at least one of said monomers in the presence of said xanthogen disulfide to form polymeric bis xanthate esters and hydrolyzing the said xanthate ester groups to produce polymeric dimercaptans.

2. The method according to claim 1 in which the degree of polymerization is at least 20.

3. The method according to claim 1 in which the xanthogen disulfide employed is diisopropyl xanthogen disulfide.

4. The method according to claim 1 in which the xanthogen disulfide employed is diethyl xanthogen disulfide.

5. The method according to claim 1 in which the monomer is at least one selected from the group consisting of styrene, butadiene, isoprene and methyl methacrylate.

6. The method according to claim 1 in which the hydrolysis of the polymeric bis xanthate ester is accomplished through reaction with a secondary amine.

References Cited in the file of this patent
UNITED STATES PATENTS

| | | |
|---|---|---|
| 2,825,662 | McKay et al. | Aug. 31, 1955 |
| 2,831,896 | Holly | Apr. 22, 1958 |
| 2,842,582 | Jenner | July 8, 1958 |
| 2,849,416 | Bender et al. | Aug. 26, 1958 |
| 2,926,158 | Martin | Feb. 23, 1960 |

OTHER REFERENCES

Snyder et al.: J.A.C.S., pp. 1422–8, 68 (1946).
Dinaburg et al.: Chem. Abstracts, p. 8157, 49 (1955).
Pierson et al.: Journal of Polymer Sci., pp. 221–246 (only pp. 245–6 relied on), XVII (1955).